(12) United States Patent
Park et al.

(10) Patent No.: US 8,572,637 B2
(45) Date of Patent: Oct. 29, 2013

(54) DISK LOADING APPARATUS WITH SMALL AND LARGE DIAMETER LOADING LEVERS

(75) Inventors: Jun-tae Park, Seoul (KR); Jeung-rak Lee, Suwon-si (KR); Young-yun Seol, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/328,376

(22) Filed: Dec. 16, 2011

(65) Prior Publication Data

US 2012/0185882 A1 Jul. 19, 2012

(30) Foreign Application Priority Data

Jan. 4, 2011 (KR) ........................ 10-2011-0000528

(51) Int. Cl.
*G11B 17/04* (2006.01)
(52) U.S. Cl.
USPC ......................................... 720/623; 720/621
(58) Field of Classification Search
USPC ................................................ 720/617–626
See application file for complete search history.

(56) References Cited

U.S. PATENT DOCUMENTS

| | | | | |
|---|---|---|---|---|
| 7,028,316 B2 * | 4/2006 | Kim et al. | ...................... | 720/621 |
| 7,634,781 B2 * | 12/2009 | Hoshinaka et al. | ........... | 720/623 |
| 2006/0048173 A1 * | 3/2006 | Lee et al. | ....................... | 720/658 |
| 2007/0174857 A1 | 7/2007 | Lee | | |
| 2007/0192776 A1 * | 8/2007 | Ahn et al. | ..................... | 720/623 |
| 2008/0134224 A1 * | 6/2008 | Wang et al. | .................. | 720/620 |
| 2008/0229338 A1 | 9/2008 | Yamanaka | | |
| 2009/0300665 A1 * | 12/2009 | Akama et al. | ................. | 720/620 |

FOREIGN PATENT DOCUMENTS

JP 2006120278 A * 5/2006

OTHER PUBLICATIONS

English translation of JP 2006120278 A.*
Communication, dated Sep. 5, 2013, issued by the European Patent Office in counterpart European Patent Application No. 11193368.5.

* cited by examiner

*Primary Examiner* — Nathan Danielsen
(74) *Attorney, Agent, or Firm* — Sughrue Mion, PLLC

(57) ABSTRACT

A disk loading apparatus includes a disk selecting unit rotatable through a rotating angle which corresponds to a size of an inserted disk, a pair of guide arms that are spaced from the disk selecting unit and are rotated by the disk, a small diameter loading lever that is rotated by one of the guide arms, a large diameter loading lever that is moved by the guide arms, a slide cam unit that is moved by the small diameter loading lever or the large diameter loading lever, and a chuck unit which is disposed between the guide arms and the disk selecting unit and is operated by the slide cam unit to chuck the disk. The small diameter loading lever and the large diameter loading lever are disposed at a same height above the guide arms.

16 Claims, 16 Drawing Sheets

DISK LOADING APPARATUS WITH SMALL AND LARGE DIAMETER LOADING LEVERS

CROSS-REFERENCE TO RELATED APPLICATIONS

This application claims priority under 35 U.S.C. §119(a) from Korean Patent Application No. 10-2011-0000528 filed Jan. 4, 2011 in the Korean Intellectual Property Office, the disclosure of which is incorporated herein by reference in its entirety.

BACKGROUND

1. Field

Apparatuses consistent with exemplary embodiments relate to a disk apparatus capable of receiving and discharging a disk medium such as a compact disk (CD), a digital versatile disk (DVD), etc., and a disk loading apparatus that transports and chucks the disk medium.

2. Description of the Related Art

Generally, a slot-in type disk apparatus can directly receive and discharge a disk medium (hereinafter, referred to a disk) without using a tray. Inside the disk apparatus is disposed a disk loading apparatus which moves the disk to a chucking position and chucks the disk. The disk loading apparatus is configured to move and chuck various types disks having different diameters.

FIGS. 1 and 2 illustrate an example of a related art disk loading apparatus 100.

Referring to FIGS. 1 and 2, when loading a small diameter disk 101 having a diameter of 8 cm, an upper slider 130 is moved downwardly by a guide lever 120 and a push lever 110 to contact an outer circumferential surface of the small diameter disk 101. At this time, an end of the push lever 110 contacts the upper slider 130 at a P1 point. As the upper slider 130 moves downward in FIG. 1, a slider cam 140 assembled integrally with the upper slider 130 moves in the same direction and allows the disk 101 to be chucked.

Meanwhile, when loading a large diameter disk 101 having a diameter of 12 cm, the end of the push lever 110 is located at a P2 point of the upper slider 130 by a disk selecting unit 150. When the large diameter disk 101 enters in this status, the upper slider 130 is moved downward in FIG. 1 by the guide lever 120 and the push lever 110 pushed by an outer circumferential surface of the large diameter disk 101. As the upper slider 130 moves, the slider cam 140 moves in the same direction and allows the disk 101 to be chucked.

However, this related art disk loading apparatus 100 is configured such that the push lever 110, the guide lever 120 and a link 151 of the disk selecting unit 150 which are used to move the slider cam 140 and to chuck the disk 101 have a three-level structure as illustrated in FIG. 2. As a result, the related art disk loading apparatus 100 has a large height. Therefore, it is difficult to miniaturize the disk apparatus.

Also, due to a structural limitation of the related art disk loading apparatus 100, the push lever 110 is located at a place interfering with an area Z in which a pickup unit moves. Therefore, there is a space limitation for preventing the pickup unit and the push lever 110 from colliding with each other. If the pickup unit collides with the push lever 110 by an impact from the outside, the pickup unit may be damaged.

SUMMARY

One or more embodiments may overcome the above drawbacks and other problems associated with the related art arrangement.

One or more embodiments provide a disk loading apparatus having a two-level structure to reduce a height of a disk apparatus.

One or more embodiments also provide a disk loading apparatus a part of which does not interfere or collide with a pickup unit.

In accordance with an aspect of an exemplary embodiment, there is provided a disk loading apparatus, which includes a disk selecting unit a rotating angle of which corresponds to a size of an inserted disk; a pair of guide arms that is spaced apart from the disk selecting unit and is rotated by the inserted disk; a small diameter loading lever that is rotated by one of the pair of guide arms; a large diameter loading lever that is moved by the pair of guide arms; a slide cam unit that is moved by the small diameter loading lever or the large diameter loading lever; and a chuck unit that is disposed between the pair guide arms and the disk selecting unit and is operated by the slide cam unit to chuck the disk, wherein the small diameter loading lever and the large diameter loading lever are disposed at a same height above the pair of guide arms.

The disk loading apparatus may include a carrying unit that is disposed below the disk selecting unit and carries the disk toward the pair of guide arms.

The carrying unit may include a supporting member disposed below the disk selecting unit; and a pair of carrying rollers that is disposed below the supporting member and carries the disk.

The carrying rollers may be a pair of tapered rollers disposed so that an end of a first tapered roller faces an end of a second tapered roller.

The disk selecting unit may include a pair of selecting levers having first ends which contact an outer circumferential surface of the disk; an intermediate link that is connected with a second end of each of the pair of selecting levers and is moved in a lateral direction according a rotation of the pair of selecting levers; and a connecting link that is disposed parallel to the slide cam unit between the small diameter loading lever and one of the pair of the selecting levers and transmits a movement of the selecting levers to the small diameter loading lever.

When the disk is a small diameter disk, the small diameter loading lever is disposed at a first position by the selecting lever and the connecting link, wherein in the first position, the small diameter loading lever interferes with the slide cam unit. When the disk is a large diameter disk, the small diameter loading lever is disposed at a second position in which the small diameter loading lever does not interfere with the slide cam unit.

A first end of each of the pair of guide arms contacts an outer circumferential surface of the disk and a second end of each of the pair of guide arms is rotatably connected to the large diameter loading lever. When the disk presses the first ends of the pair of guide arms, the pair of guide arms causes the large diameter loading lever to move toward the slide cam unit.

A first guide arm of the pair of guide arms is connected with the large diameter loading lever at a first arm connecting portion and a second guide arm of the pair of guide arms is connected with the large diameter loading lever at a second arm connecting portion. The first arm connecting portion and the second arm connecting portion are disposed on opposite sides of a straight line joining a rotation center of the first guide arm and a rotation center of the second guide arm.

The slide cam unit may include a small diameter contacting portion which is contactable with the small diameter loading lever; and a large diameter contacting portion which is contactable with the large diameter loading lever.

The large diameter contacting portion may be a sloping surface and the large diameter loading lever may be a roller which is contactable with the sloping surface.

When the disk is a large diameter disk, the large diameter loading lever causes the slide cam unit to move in a straight line, and when the disk is a small diameter disk, the small diameter loading lever causes the slide cam unit to move in a straight line.

One of the pair of guide arms nearer to the slide cam unit may include a stop protrusion that contacts the slide cam and restricts rotation of the guide arm.

When the disk is a small diameter disk, the stop protrusion contacts the slide cam unit, thereby restricting a rotating angle of the guide arm, and when the disk is a large diameter disk, the stop protrusion does not contact the slide cam unit and does not restrict rotation of the guide arm.

One of the large diameter loading lever and one of the pair of guide arms may include a line-shape protrusion to prevent a surface of the large diameter loading lever from contacting a surface of one of the pair of guide arms.

When no disk is inserted in the disk loading apparatus, the small diameter loading lever is disposed at a position in which it interferes with the slide cam unit, and the large diameter loading lever is disposed at a position in which is does not interfere with the slide cam unit.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
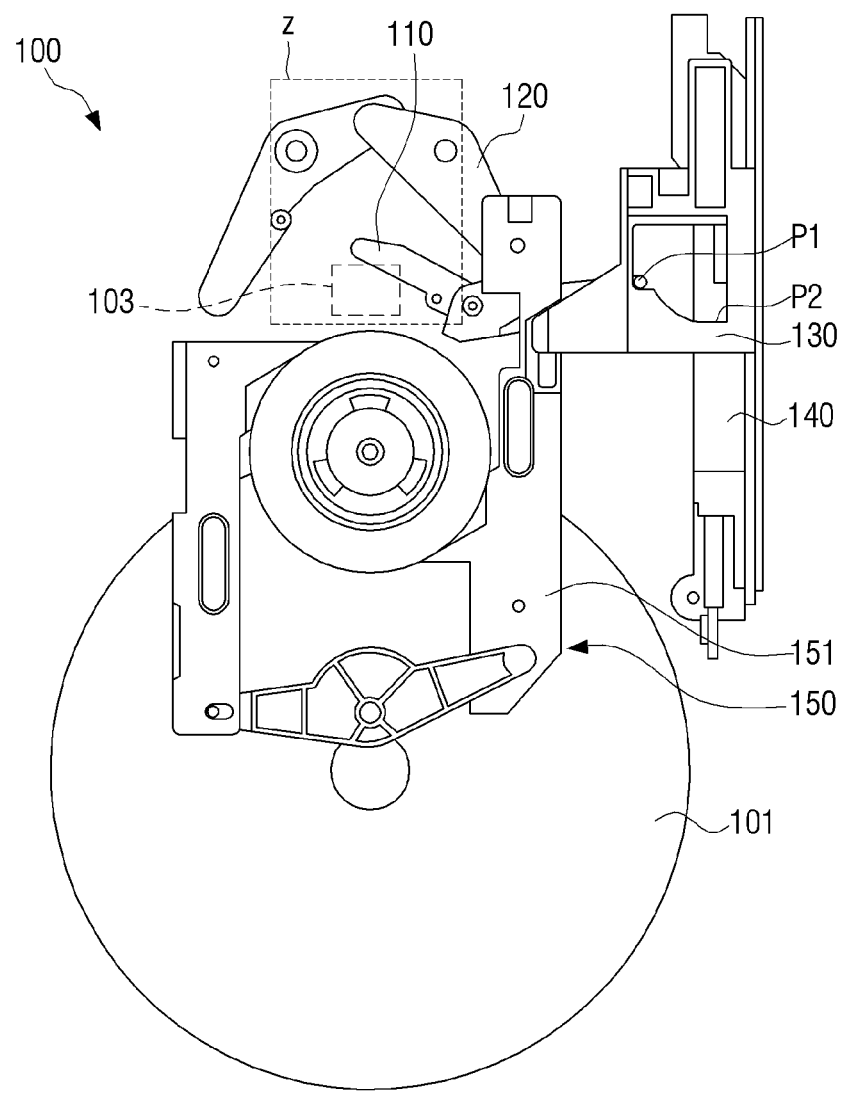
FIG. 1 is a plane view schematically illustrating a related art disk loading apparatus.
Figure 2:
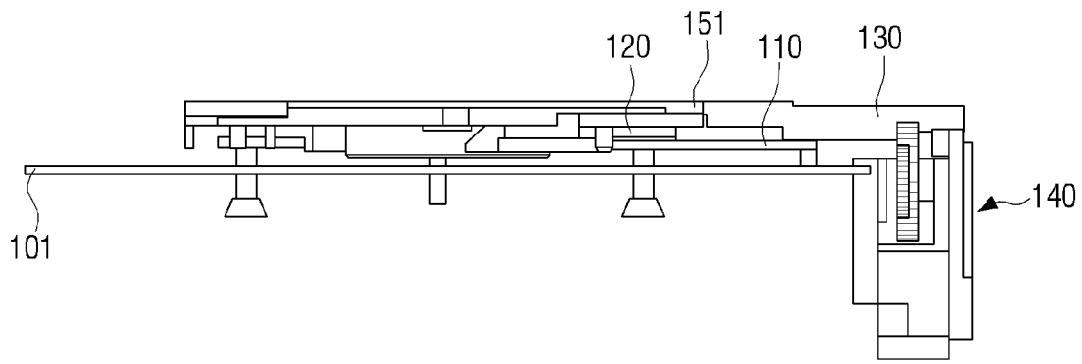
FIG. 2 is a front view illustrating the disk loading apparatus of FIG. 1.

Hereinafter, certain exemplary embodiments will be described in detail with reference to the accompanying drawings. Throughout the drawings, like reference numerals will be understood to refer to like parts, components and structures.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 3:
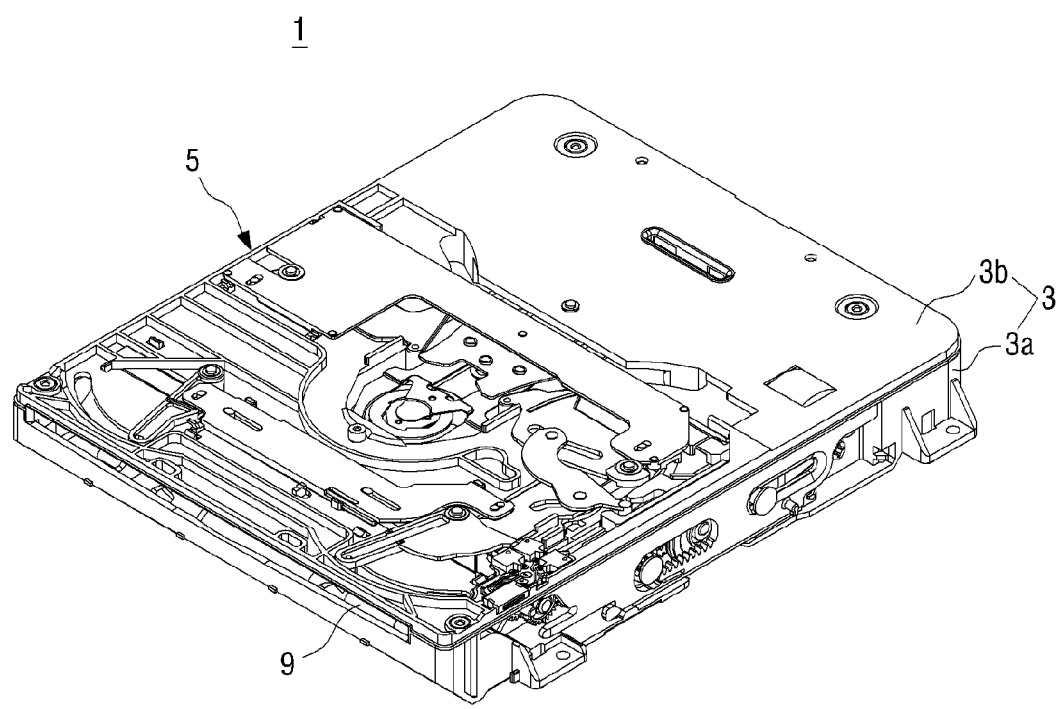
FIG. 3 is a perspective view illustrating a disk apparatus having a disk loading apparatus according to an exemplary embodiment.
Figure 4:
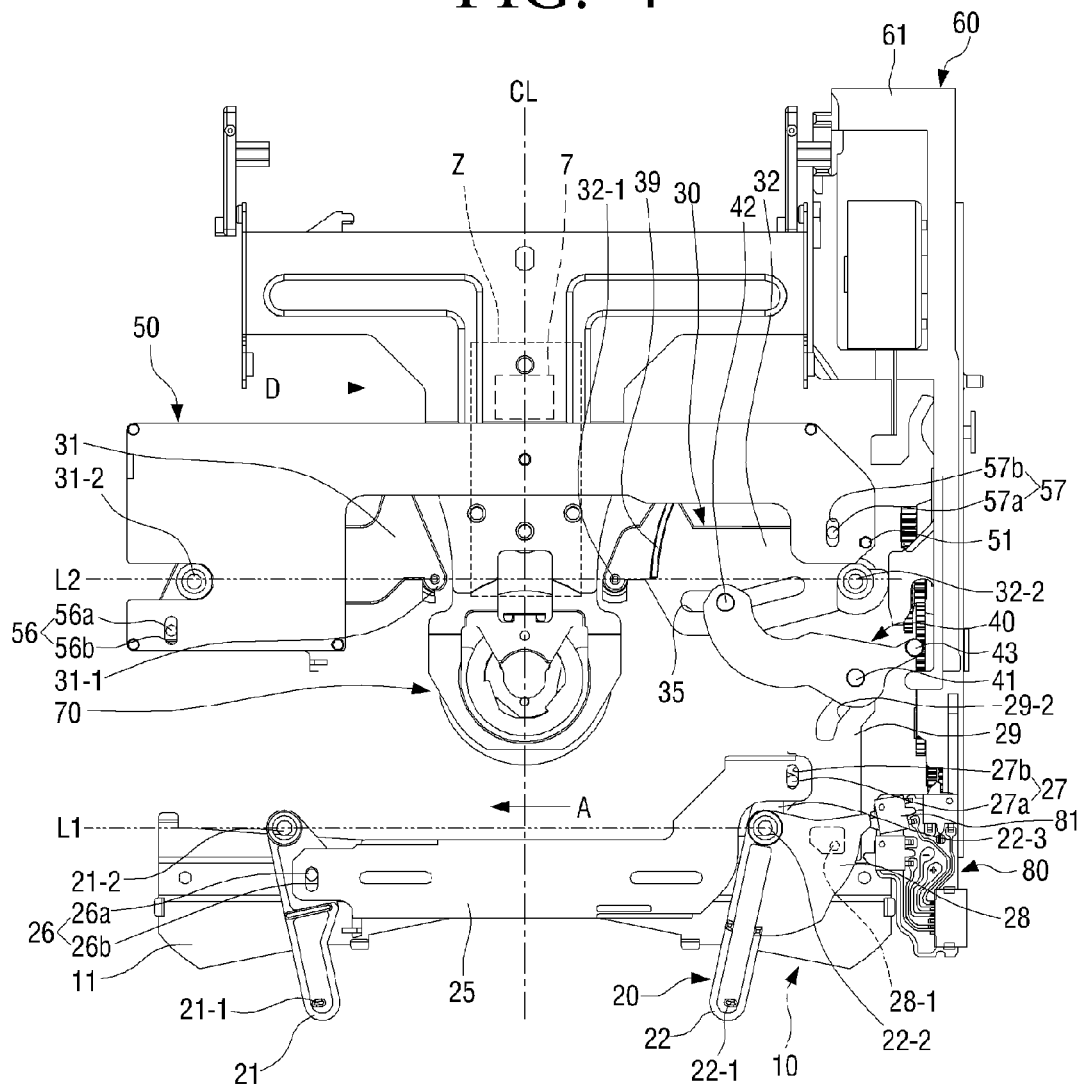
FIG. 4 is a plane view illustrating a disk loading apparatus separated from the disk apparatus of FIG. 3.
Figure 5:
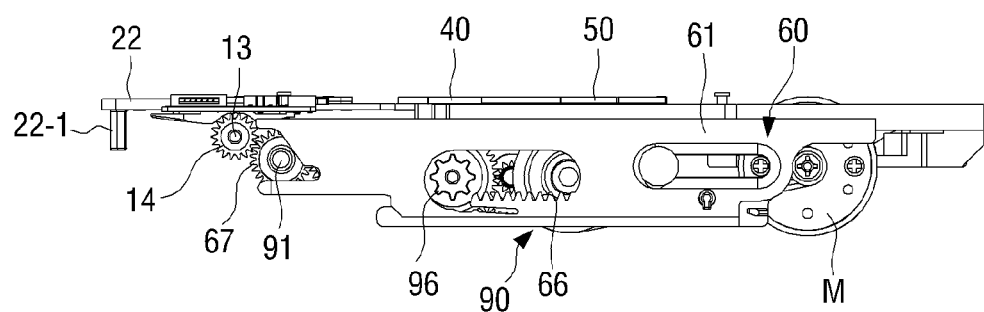
FIG. 5 is a side view illustrating the disk loading apparatus of FIG. 4.
Figure 6:
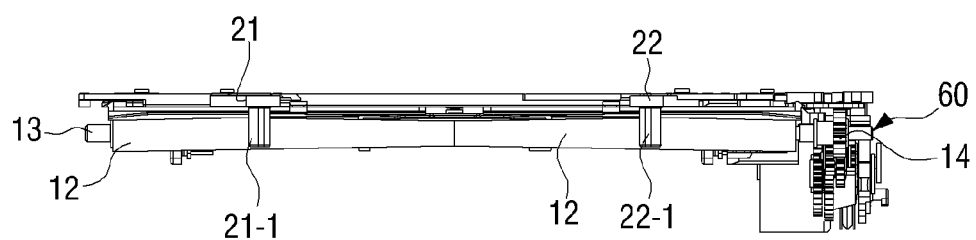
FIG. 6 is a front view illustrating the disk loading apparatus of FIG. 4.

FIG. 3 is a perspective view illustrating a disk apparatus having a disk loading apparatus according to an exemplary embodiment, and FIG. 4 is a plane view illustrating the disk loading apparatus separated from the disk apparatus of FIG. 3. FIG. 5 is a side view illustrating the disk loading apparatus of FIG. 4, and FIG. 6 is a front view illustrating the disk loading apparatus of FIG. 4.

Referring to FIG. 3, the disk apparatus 1 is configured to receive and discharge a disk medium (hereinafter, referred to as a disk) such as a CD, a DVD, etc., and may include a case 3, a disk loading apparatus 5, and a pickup unit 7 (see FIG. 4).

The case 3 supports the disk loading apparatus 5. A chuck unit 70 and the pickup unit 7 are disposed inside the case 3. On a front surface of the case 3 is formed an entering opening 9 that is formed in a slot shape and into which a small diameter disk (SD) or a large diameter disk (LD) is inserted. The case 3 may be formed to have an upper case 3b and a lower case 3a for convenience of assembling other parts.

The disk loading apparatus 5 allows the disk, which enters through the entering opening 9 of the case 3, to move and be aligned with a center of the chuck unit 70, and then, allows the chuck unit 70 to chuck the disk. The disk loading apparatus 5 may include a carrying unit 10, a disk selecting unit 20, a pair of guide arms 30, a small diameter loading lever 40, a large diameter loading lever 50, a slide cam unit 60, and the chuck unit 70.

The carrying unit 10 is configured to automatically carry the disk entering through the entering opening 9 above the chuck unit 70. The carrying unit 10 may be formed to have various structures. Alternatively, the carrying unit 10 may not be disposed in the disk loading apparatus 5. In the present embodiment, referring to FIGS. 4 and 6, the carrying unit 10 includes a supporting member 11 and a pair of carrying rollers 12.

The supporting member 11 is disposed adjacent to the entering opening 9 under the disk selecting unit 20 inside the case 3. The supporting member 11 supports for the pair of carrying rollers 12 to rotate. The pair of carrying rollers 12 is disposed in a row on a rotation shaft 13 so that ends of the pair of carrying rollers 12 face each other. Each of the pair of carrying rollers 12 may a tapered roller. A feeding gear 14 is disposed at an end of the rotation shaft 13. The feeding gear 14 is meshed with a feed driving gear 91 disposed inside the slide cam unit 60. On the supporting member 11 may be formed tapered portions corresponding to tapers of the pair of carrying rollers 12. The pair of carrying rollers 12 may be formed to move in a vertical direction according to a size of the disk and allow the entered disk to move toward the pair of guide arms 30.

The disk selecting unit 20 may mechanically detect the size of the disk entering through the entering opening 9 so as to cause the disk loading apparatus 5 to operate. The disk selecting unit 20 may be configured to use a sensor differently from the present embodiment. The disk selecting unit 20 according to the present embodiment may include a pair of selecting lever 21 and 22, an intermediate link 25, and a connecting link 29.

Figure 11:
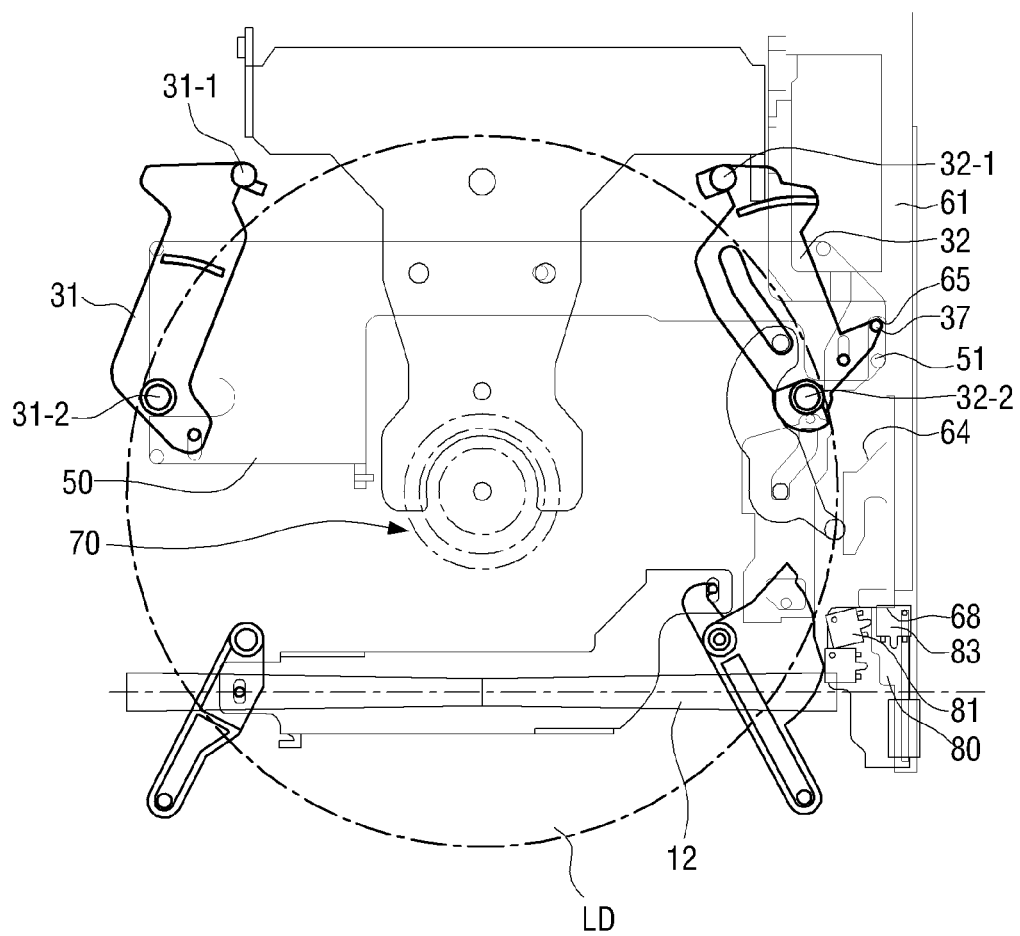
FIG. 11 is a plane view illustrating a state in that the slide cam unit allows arm projections of the pair of guide arms to be spaced apart from the large diameter disk in the disk loading apparatus of FIG. 10.

The pair of selecting levers 21 and 22 is disposed to contact the outer circumferential surface of the entering disk so as to rotate. Referring FIG. 4, a left selecting lever 21 is disposed to rotate on a first selecting rotation shaft 21-2 and a right selecting lever 22 is disposed to rotate on a second selecting rotation shaft 22-2. The first and second selecting rotation shafts 21-2 and 22-2 may be secured with respect to the case 3 by the supporting member 11 or other bracket. On the right selecting lever 22 may be disposed a dog 28 which allows a driving switch 81 disposed at a side of the disk selecting unit 20 to operate. The driving switch 81 is disposed on a switch board 80 together with a chuck switch 83 (FIG. 11). As the driving switch 81 turns on, a driving motor M rotates, and then, a rotation force of the driving motor M is transmitted to the feeding gear 14 via the feed driving gear 91, thereby rotating the carrying roller 12. Also, referring to FIGS. 5 and 6, a protrusion 21-1 and 22-1 is formed downwardly on an end of each of the pair of selecting lever 21 and 22. The outer circumferential surface of the disk entering the entering opening 9 of the case 3 contacts the protrusions 21-1 and 22-1 of the pair of selecting levers 21 and 22.

The intermediate link 25, as illustrated in FIG. 4, is disposed between the pair of selecting levers 21 and 22 and moves in a side direction according to a motion of the pair of selecting levers 21 and 22. A first end of the intermediate link 25 is connected with the left selecting lever 21 and a second end of the intermediate link 25 is connected with the right selecting lever 22. At this time, the pair of selecting levers 21 and 22 are connected with the intermediate link 25 so that although each of the pair of selecting levers 21 and 22 rotates in an opposite direction by the disk, the intermediate link 25 moves in a straight line in one direction, that is, in a left direction (arrow A) in FIG. 4. For this, a first connecting portion 26 at which the first end of the intermediate link 25 is connected with the left selecting lever 21 and a second connecting portion 27 at which the second end of the intermediate link 25 is connected with the right selecting lever 22 may be disposed to place at opposite sides with respect to a straight line L1 joining the first selecting rotation shaft 21-2 and the second selecting rotation shaft 22-2.

In an embodiment of FIG. 4, the first connecting portion 26 at which the first end of the intermediate link 25 and the left selecting lever 21 are connected with each other is formed at a place near to the first selecting rotation shaft 21-2 between the first selecting rotation shaft 21-2 and the protrusion 21-1 of the left selecting lever 21. The second connecting portion 27 at which the second end of the intermediate link 25 and the right selecting lever 22 are connected with each other is formed at a extension portion 22-3 extending in a direction opposite to the protrusion 22-1 of the right selecting lever 22 from the second selecting rotation shaft 22-2. The first connecting portion 26 has a first pin 26a formed at the left selecting lever 21 and a first through hole 26b formed at the first end of the intermediate link 25. The second connecting portion 27 has a second pin 27a formed at the right selecting lever 22 and a second through hole 27b formed at the second end of the intermediate link 25. At this time, the first and second through holes 26b and 27b may be formed as elongated holes in which the first and second pins 26a and 27a are inserted and move, respectively. Therefore, the left and right selecting levers 21 and 22 can rotate with respect to the intermediate link 25.

The connecting link 29 moves in association with the pair of selecting lever 21 and 22 to determine a location of the small diameter loading lever 40. In other words, when the small diameter disk SD enters, the connecting link 29 causes the small diameter loading lever 40 to be located at the first position at which the small diameter loading lever 40 interferes with the slide cam unit 60. If the position at which the small diameter loading lever 40 interferes with a slide cam 61 is an original position as the present embodiment, the small diameter loading lever 40 maintains the original position. When the large diameter disk LD enters, the connecting link 29 causes the small diameter loading lever 40 to be located at a second position at which the small diameter loading lever 40 does not interfere with the slide cam unit 60.

In this embodiment, the connecting link 29 is formed to be supported by the case 3 and to move in a straight line due to movement of the right selecting lever 22. A through hole 29-1 is formed near the first end of the connecting link 29. A second guiding groove 29-2 is formed near the second end of the connecting link 29. A connecting projection 28-1 formed on a bottom surface of the dog 28 of the right selecting lever 22 is inserted in the through hole 29-1. The through hole 29-1 is formed so that when the right selecting lever 22 rotates in a maximum angle, the connecting projection 28-1 forces the connecting link 29 to move in a disk inserting direction, that is, in an upward direction in FIG. 4. Also, the through hole 29-1 is formed so that when the right selecting lever 22 is rotated by the small diameter disk SD, that is, when the right selecting lever 22 does not rotate in the maximum angle, the connecting projection 28-1 does not force the connecting link 29 to move in the upward direction. A second guiding pin 41 of the small diameter loading lever 40 is inserted in a second guiding groove 29-2 of the connecting link 29. The second guiding groove 29-2 is formed so that as the connecting link 29 is moved upwardly by the connecting projection 28-1, the second guiding groove 29-2 causes the small diameter loading lever 40 to move in a left direction in FIG. 4, thereby being located at the second position at which the small diameter loading lever 40 does not interfere with the slide cam 61. The second guiding groove 29-2 includes a first receiving portion B1 (see FIG. 7), a second receiving portion B2 (see FIG. 7), and an inclined portion joining the first receiving portion B1 and the second receiving portion B2. When the second guiding pin 41 of the small diameter loading lever 40 is at the first receiving portion B1, a nose 43-1 (see FIG. 8) of the small diameter loading lever 40 is located at the first position at which interfering with the slide cam 61. When the second guiding pin 41 of the small diameter loading lever 40 is at the second receiving portion B2, the nose 43-1 of the small diameter loading lever 40 is located at the second position at which the nose 43-1 does not interfere with the slide cam 61.

The pair of guide arms 30 allows the small diameter loading lever 40 or the large diameter loading lever 50 to operate corresponding to a loading disk so that the slide cam 61 moves in a straight line. The pair of guide arms 30 is disposed above the chuck unit 70 and includes a left guide arm 31 and a right guide arm 32. The left guide arm 31 is disposed to rotate on a first arm rotation shaft 31-2 secured to the case 3. On an end of the left guide arm 31 is formed an arm protrusion 31-1 to contact the outer circumferential surface of the disk.

The right guide arm 32 is disposed to rotate on a second arm rotation shaft 32-2 secured to the case 3. The first and second arm rotation shafts 31-2 and 32-2 are disposed symmetrically with respect to a center line CL of the chuck unit 70. On an end of the right guide arm 31 is formed an arm protrusion 32-1 to contact the outer circumferential surface of the disk. The arm protrusions 31-1 and 32-1 of the left and right guide arms 31 and 32 are formed symmetrically with respect to the center line CL of the chuck unit 70 to simultaneously contact the disk. On a top surface of each of the left and right guide arms 31 and 32 may be formed a line-shape protrusion 39 to minimize friction with the large diameter loading lever 50. In the right guide arm 32 is formed a first guiding groove 35 to cause the small diameter loading lever 40 to operate. Also, a stop protrusion 37 (FIG. 7) is formed on the right guide arm 32 at a straight line approximately coinciding with a straight line joining the second arm rotation shaft 32-2 and the second arm connecting portion 57. The stop protrusion 37 of the right guide arm 32 contacts a stop wall 69 (FIG. 7) of the slide cam 61 to restrict a position of the small diameter disk SD. When the small diameter disk SD is blocked to move by the stop protrusion 37, a center of the small diameter disk SD is aligned with the center of the chuck unit 70, thereby completing a centering operation. However, when the pair of guide arms 30 is rotated by the large diameter disk LD, the stop protrusion 37 does not interfere with the stop wall 69 of the slide cam 61. Also, when the stop protrusion 37 of the right guide arm 32 is inserted into a second separating groove 65 (FIG. 7) of the slide cam 61, the right guide arm 32 further rotates by a predetermined angle in a clockwise direction.

The small diameter loading lever 40 is disposed between the pair of guide arms 30 and the disk selecting unit 20 above the right guide arm 32. A first end of the small diameter loading lever 40 is connected with one guide arm 32 of the pair of guide arms 30. Referring to FIG. 4, in this embodiment, the first end of the small diameter loading lever 40 is connected with the right guide arm 32 of the pair of guide arms 30. A first guide pin 42 is formed at the first end of the small diameter loading lever 40 and inserted in a first guiding groove 35 formed at the right guide arm 32. A second end of the small diameter loading lever 40 is connected with the connecting link 29 capable of moving in a straight line. At the second end of the small diameter loading lever 40 is formed the second guide pin 41 that is inserted in the second guiding groove 29-2 of the connecting link 29 and moves. Also, a nose 43-1 (FIG. 7) is formed at a position near the second guide pin 41 of the second end of the small diameter loading lever 40. A first pressing projection 43 projects downward from the nose 43-1 and presses a small diameter contacting portion 62 (FIG. 7) of the slide cam 61. The first pressing projection 43 may be formed as a bush or a boss having a roller shape for minimizing friction.

The first guiding groove 35 guides the first guide pin 42 of the small diameter loading lever 40 so that the small diameter loading lever 40 rotates by a predetermined angle on the second guide pin 41 corresponding to rotation of the right guide arm 32. Therefore, when the disk enters and causes the pair of guide arms 30 to rotate, the small diameter loading lever 40 also rotates on the second guide pin 41 in the same direction.

The large diameter loading lever 50 is disposed above the pair of guide arms 30. The large diameter loading lever 50 is disposed at the same height as that of the small diameter loading lever 40, that is, on the same plane, as shown in FIG. 5. Therefore, the disk loading apparatus 5 according to an embodiment is formed as a two-level structure. In other words, the connecting link 29 and the pair of guide arms 30 form a first level, and the small diameter loading lever 40 and the large diameter loading lever 50 are located above the pair of guide arms 30 and forms a second level. Further, the intermediate link 25 and the dog 28 of the disk selecting unit 20 are disposed on the same plane as that of the large diameter loading lever 50 and the small diameter loading lever 40.

The large diameter loading lever 50 is connected with the pair of guide arms 30 to move in a straight line by rotation of the pair of the guide arm 30. Therefore, an end of each of the pair of guide arms 30 contacts the outer circumferential surface of the disk and the other end of each of the pair of guide arms 30 is rotatably connected with the large diameter loading lever 50. As a result, when the LD presses the ends of the pair of guide arms 30, the pair of guide arms 30 causes the large diameter loading lever 50 to move toward the slide cam unit 60.

The pair of guide arms 30 are connected so that although each of the pair of guide arms 30 rotates in a direction opposite to each other due to the disk, the large diameter loading lever 50 moves in a straight line in one direction, that is, in a right direction (arrow D) in FIG. 4.

For this, a first arm connecting portion 56 at which the first end of the large diameter loading lever 50 is connected with the left guide arm 31 and a second arm connecting portion 57 at which the second end of the large diameter loading lever 50 is connected with the right guide arm 32 may be disposed at opposite sides to each other with respect to the straight line L2 joining the first arm rotation shaft 31-2 and the second arm rotation shaft 32-2. In an embodiment illustrated in FIG. 4, the first arm connecting portion 56 at which the first end of the large diameter loading lever 50 and the left guide arm 31 are connected with each other is formed near the first arm rotation shaft 31-2. The second arm connecting portion 57, at which the second end of the large diameter loading lever 50 and the right guide arm 32 are connected with each other, is formed on an opposite side from the first arm connecting portion 56 and near the second arm rotation shaft 32-2. The first arm connecting portion 56 includes a first pin 56a formed on the left guide arm 31 and a first through hole 56b formed at the first end of the large diameter loading lever 50. The second arm connecting portion 57 includes a second pin 57a formed on the right guide arm 32 and a second through hole 57b formed at the second end of the large diameter loading lever 50. The first and second through holes 56b and 57b may be formed as elongated holes so that the first and second pins 56a and 57a may be inserted into and move within the first and second through holes 56b and 57b. Therefore, each of the left and right guide arms 31 and 32 may rotate with respect to the large diameter loading lever 50.

A second pressing projection 51 is formed at the second end of the large diameter loading lever 50 adjacent to the slide cam unit 60. The second pressing projection 51 projects downwardly from near the second end of the large diameter loading lever 50 to contact a large diameter contacting portion 64 (FIG. 7) of the slide cam 61. The second pressing projection 51 may be formed as a bush or a boss having a roller shape for minimizing friction with the large diameter contacting portion 64 of the slide cam 61.

The slide cam unit 60 includes the slide cam 61 and a cam supporting member (not illustrated). The cam supporting member supports the slide cam 61 to move in a straight line due to a movement of the large diameter loading lever 50 or the small diameter loading lever 40. The cam supporting member may be formed on a side wall of the case 3. A gear train 90 transmitting power of the driving motor M to the carrying rollers 12 is disposed near an area of the cam supporting member which does not interfere with the slide cam 61. At an end of the gear train 90 is disposed the feed driving gear 91 that meshes with the feeding gear 14 of the carrying unit 10.

The slide cam 61 is moved by the large diameter loading lever 50 or the small diameter loading lever 40 to operate the chuck switch 83 (FIG. 11) disposed on the switch board 80. A rack gear 66 is formed in a side surface of the slide cam 61 and meshed with a cam gear 96 of the gear train 90. On a top surface of the slide cam 61 are formed the small diameter contacting portion 62 (FIG. 7) to contact the small diameter loading lever 40 and the large diameter contacting portion 64 (FIG. 7) to contact the large diameter loading lever 50. The large diameter contacting portion 64 is formed as a sloping surface. When the second pressing projection 51 of the large diameter loading lever 50 pushes the sloping surface, the slide cam 61 may be formed to move approximately 2 mm. A second separating groove 65 (FIG. 7) in which the stop protrusion 37 of the right guide arm 32 and the second pressing projection 51 can be inserted is formed behind the large diameter contacting portion 64 in parallel to the slide cam 61. When the stop protrusion 37 of the right guide arm 32 is inserted in the second separating groove 65, the arm protrusions 31-1 and 32-1 of the pair of guide arms 30 are separated from the disk. Further, a first separating groove 63 (FIG. 7) in which the first pressing projection 43 of the small diameter loading lever 40 can be inserted is formed behind the small diameter contacting portion 62 in parallel to the slide cam 61. When the first pressing projection 43 of the small diameter loading lever 40 is inserted in the first separating groove 63, the arm protrusions 31-1 and 32-1 of the pair of guide arms 30 are separated from the disk.

At a front end of the slide cam 61 is formed a shaft pressing portion 67 to press the rotation shaft 13 of the carrying unit 10 downward. Therefore, when the slide cam 61 moves and then the shaft pressing portion 67 presses the rotation shaft 13, the rotation shaft 13 moves in a downward direction along the shaft pressing portion 67 so that the carrying roller 12 is separated from the disk.

When the chuck switch 83 is turned on by the slide cam 61, the chuck unit 70 chucks the disk a center of which is aligned with the center of the chuck unit 70. The chuck unit 70 may chuck the disk by a magnetic chucking method. The chuck unit 70 is not limited to the magnetic chucking method. The chuck unit 70 may use any of various chucking methods as long as the chuck unit 70 can chuck the disk.

Hereinafter, operation of a disk loading apparatus 5 according to an exemplary embodiment will be explained with reference to accompanying figures.

The disk loading apparatus 5 according to an exemplary embodiment may load two kinds of disks therein. In other words, the disk loading apparatus 5 can align either of two kinds of disks such as the small diameter disks (for example, a disk having a diameter of 8 cm) and the large diameter disks (for example, a disk having a diameter of 12 cm) with the center of the chuck unit 70, and then, chuck the disk.

Operations in which the disk loading apparatus 5 loads the large diameter disk LD therein will be explained with reference to FIGS. 7 to 11.

Figure 7:
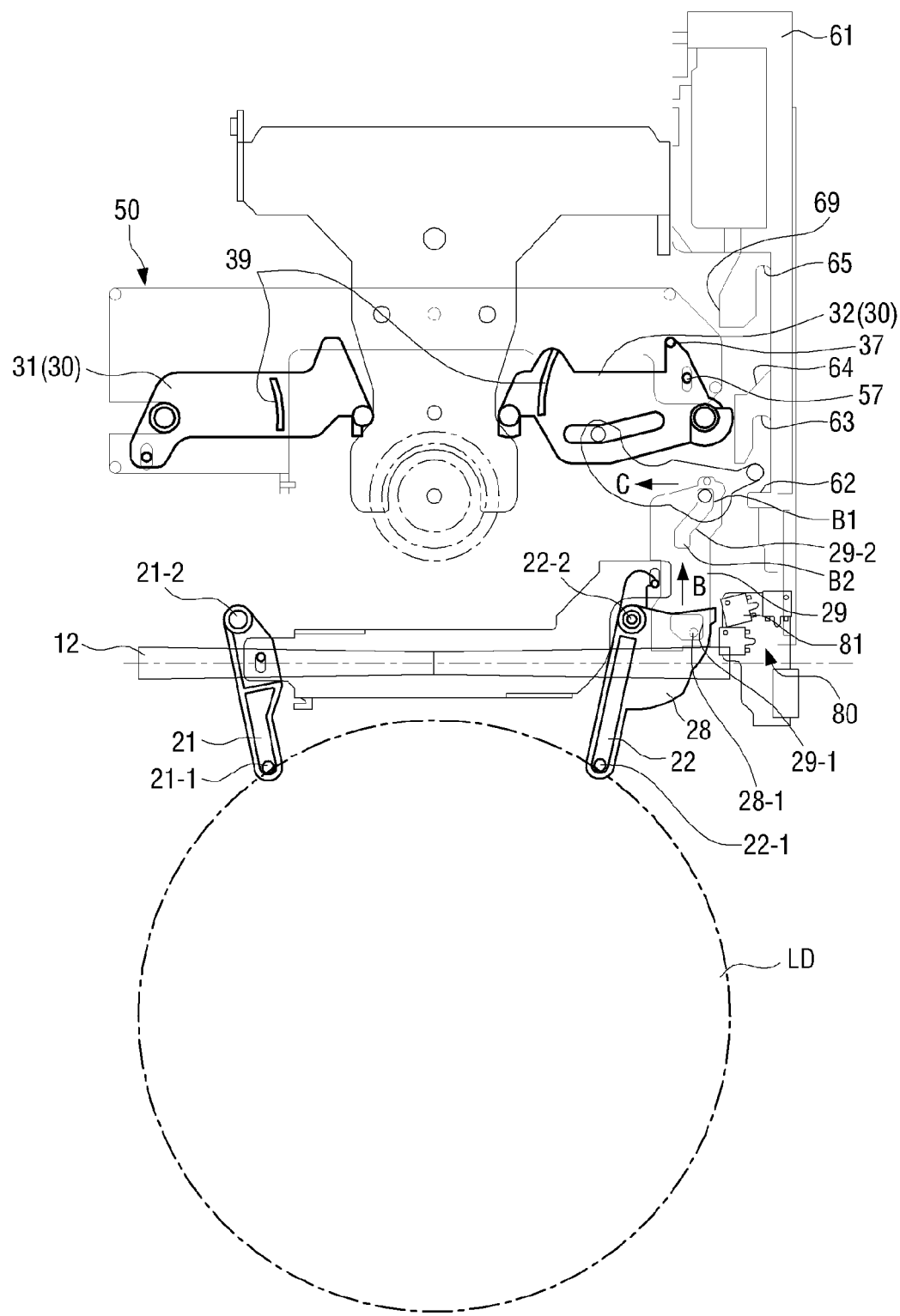
FIG. 7 is a plane view illustrating a state before a large diameter disk is inserted into the disk loading apparatus of FIG. 4.

FIG. 7 illustrates the disk loading apparatus 5 before the large diameter disk LD is inserted therein. At this time, the small diameter loading lever 40 (FIG. 4) is located in the first position in which the small diameter loading lever 40 interferes with the slide cam 61. The dog 28 of the right selecting lever 22 of the disk selecting unit 20 contacts the driving switch 81 and the carrying roller 12 of the carrying unit 10 is stopped.

Figure 8:
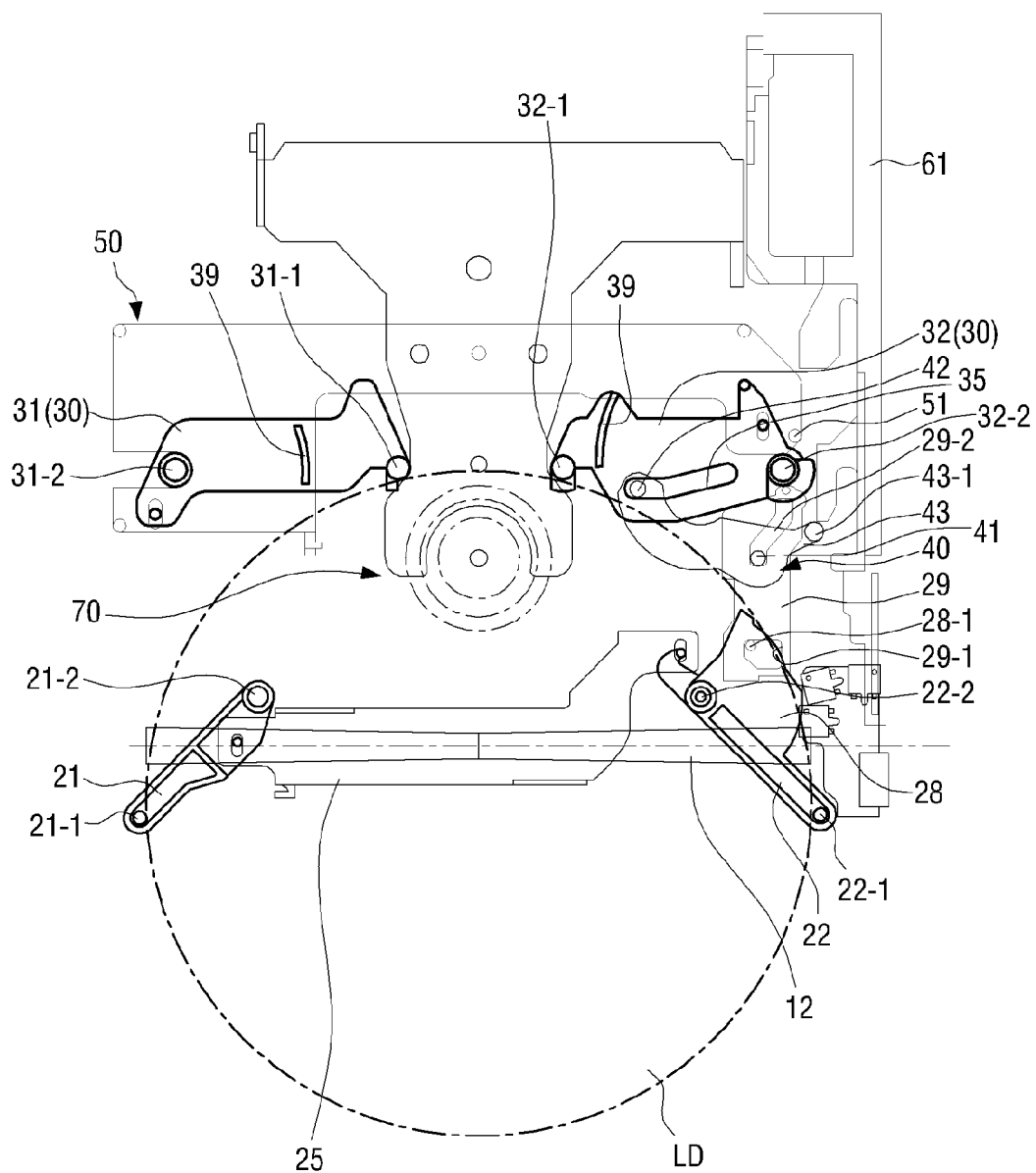
FIG. 8 is a plane view illustrating a state in that the large diameter disk begins to contact a pair of guide arms in the disk loading apparatus of FIG. 7.

When the disk LD is inserted, the left and right selecting levers 21 and 22 are rotated. When the right selecting lever 22 rotates, the dog 28 is rotated to separate from the driving switch 81. Then the driving switch 81 turns on to operate the driving motor M. As the driving motor M operates, the carrying roller 12 of the carrying unit 10 is rotated via the gear train 90. When the carrying roller 12 rotates, the inserted disk LD is automatically moved toward the chuck unit 70 by the carrying roller 12. When the disk LD moves so that a middle portion of the disk LD (that is, a portion corresponding to a maximum width of the disk LD) contacts the projections 21-1 and 22-1 of the pair of selecting levers 21 and 22, as illustrated in FIG. 8, the pair of selecting levers 21 and 22 is maximally rotated. Then the connecting projection 28-1 of the dog 28 which is inserted in the through hole 29-1 of the connecting link 29 moves the connecting link 29 in the disk-inserting direction (arrow B). As the connecting link 29 is moved in the disk-inserting direction, the second guide pin 41 of the small diameter loading lever 40, which is inserted in the first receiving portion B1 of the second guiding groove 29-2 of the connecting link 29, moves along the inclined portion, and then, is located at the second receiving portion B2 of the second guiding groove 29-2. Then, the small diameter loading lever 40 moves in a left direction (arrow C) so that the nose 43-1 is located at the second position at which the nose 43-1 does not interfere with the slide cam 61.

Figure 9:
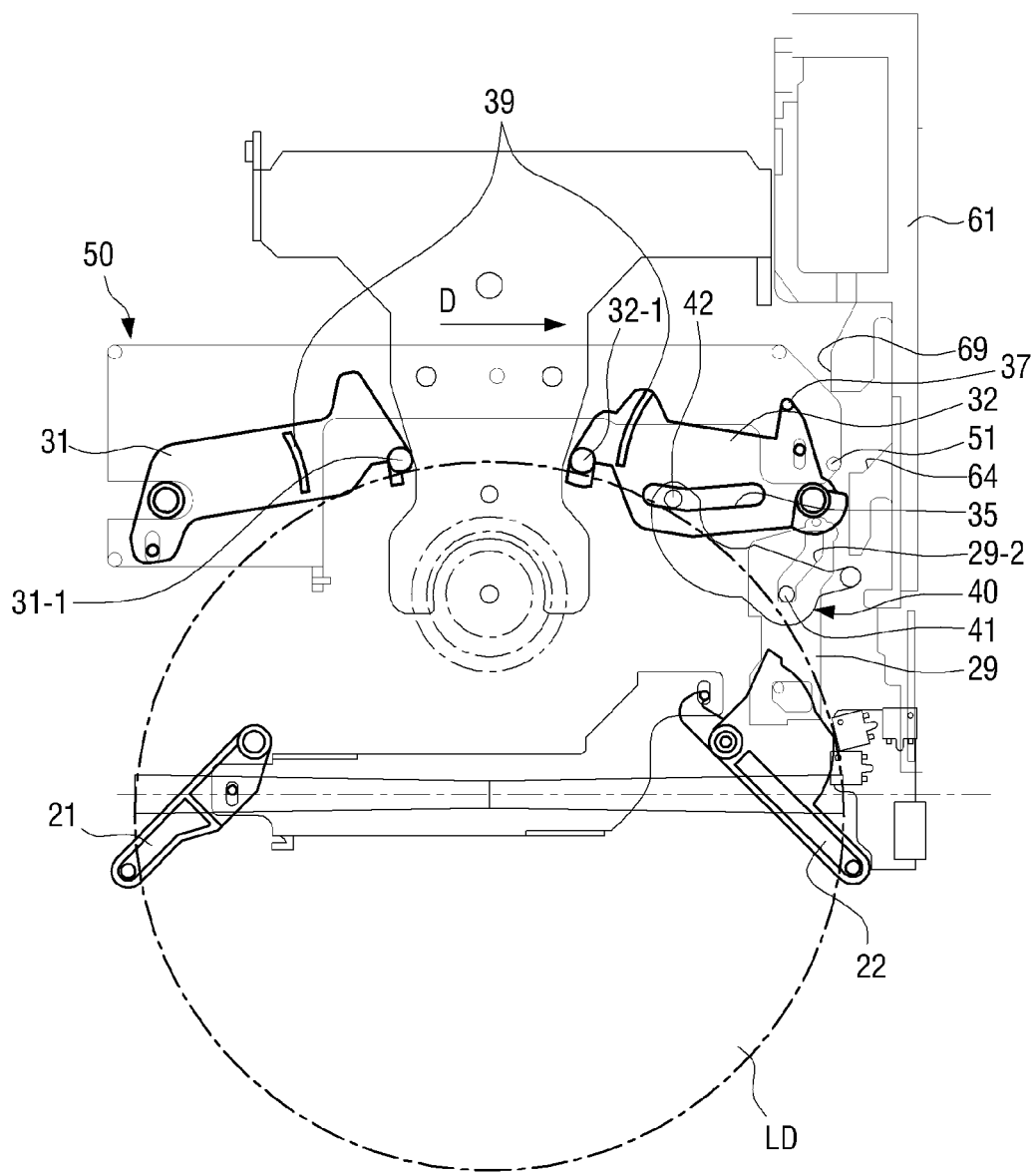
FIG. 9 is a plane view illustrating a state in that the pair of guide arms are rotated by the large diameter disk in the disk loading apparatus of FIG. 8.
Figure 10:
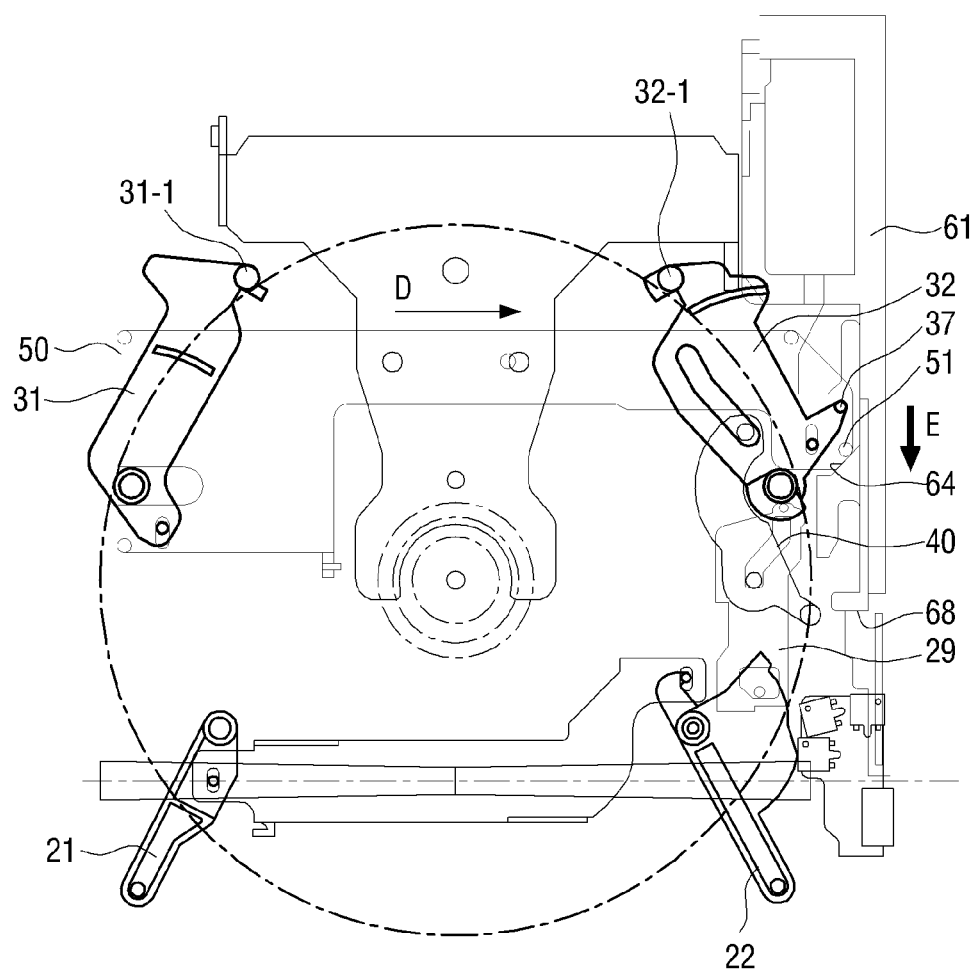
FIG. 10 is a plane view illustrating a state in that a large diameter loading lever allows a slide cam unit to move by the large diameter disk in the disk loading apparatus of FIG. 9.

When the disk LD moves in this state, as illustrated in FIG. 9, the outer circumferential surface of the disk LD contacts the arm protrusions 31-1 and 32-1 of the pair of guide arms 30. While the disk LD continuously moves, the pair of guide arms 30 is rotated on the first and second arm rotation shafts 31-2 and 32-2 due to the movement of the disk LD. When the pair of guide arms 30 rotate, as illustrated in FIG. 10, the large diameter loading lever 50 moves in a right direction (arrow D). When the large diameter loading lever 50 moves in the right direction, the second pressing projection 51 of the large diameter loading lever 50 contacts the large diameter contacting portion 64 of the slide cam 61. While the large diameter loading lever 50 continuously moves in the right direction, the slide cam 61 is moved in a direction opposite to the disk-inserting direction (arrow E, a down direction in FIG. 10) by the second pressing projection 51. A moving distance of the slide cam 61 is determined by the large diameter loading lever 50 and the large diameter contacting portion 64. In this embodiment, the slide cam 61 is formed to move approximately 2 mm. When the large diameter loading lever 50 maximally moves, the center of the large diameter disk LD is aligned with the center of the chuck unit 70.

When the slide cam 61 moves approximately 2 mm, the rack gear 66 of the slide cam 61 is meshed with the cam gear 96 of the gear train 90 (FIG. 5). Then, the slide cam 61 is continuously moved in the down direction (arrow E) in FIG. 10 by the power of the driving motor M so that the pressing portion 68 operates the chuck switch 83. When the chuck switch 83 operates, the chuck unit 70 is operated to chuck the disk LD. After that, when the stop protrusion 37 of the right guide arm 32 is inserted in the second separating groove 65 of the slide cam 61, as illustrated in FIG. 11, the pair of guide arms 30 is further rotated by a predetermined angle so that the arm protrusions 31-1 and 32-1 are separated from the outer circumferential surface of the disk LD. Also, the shaft pressing portion 67 of the slide cam 61 causes the rotation shaft 13 of the carrying roller 12 to move downward so that the disk LD is separated from the carrying roller 12 (FIG. 5). Therefore, the disk LD can be rotated without interference with the chuck unit 70.

According to this embodiment, the pickup unit 7 (see FIG. 4) moves in an area Z in which the pickup unit 7 does not interfere with the rotating area of the pair of guide arms 30. Accordingly, the pickup unit 7 is not interfered with and does not collide with the pair of guide arms 30.

Operations in which the disk loading apparatus 5 loads the small diameter disk SD therein will be explained with reference to FIGS. 12 to 16.

Figure 12:
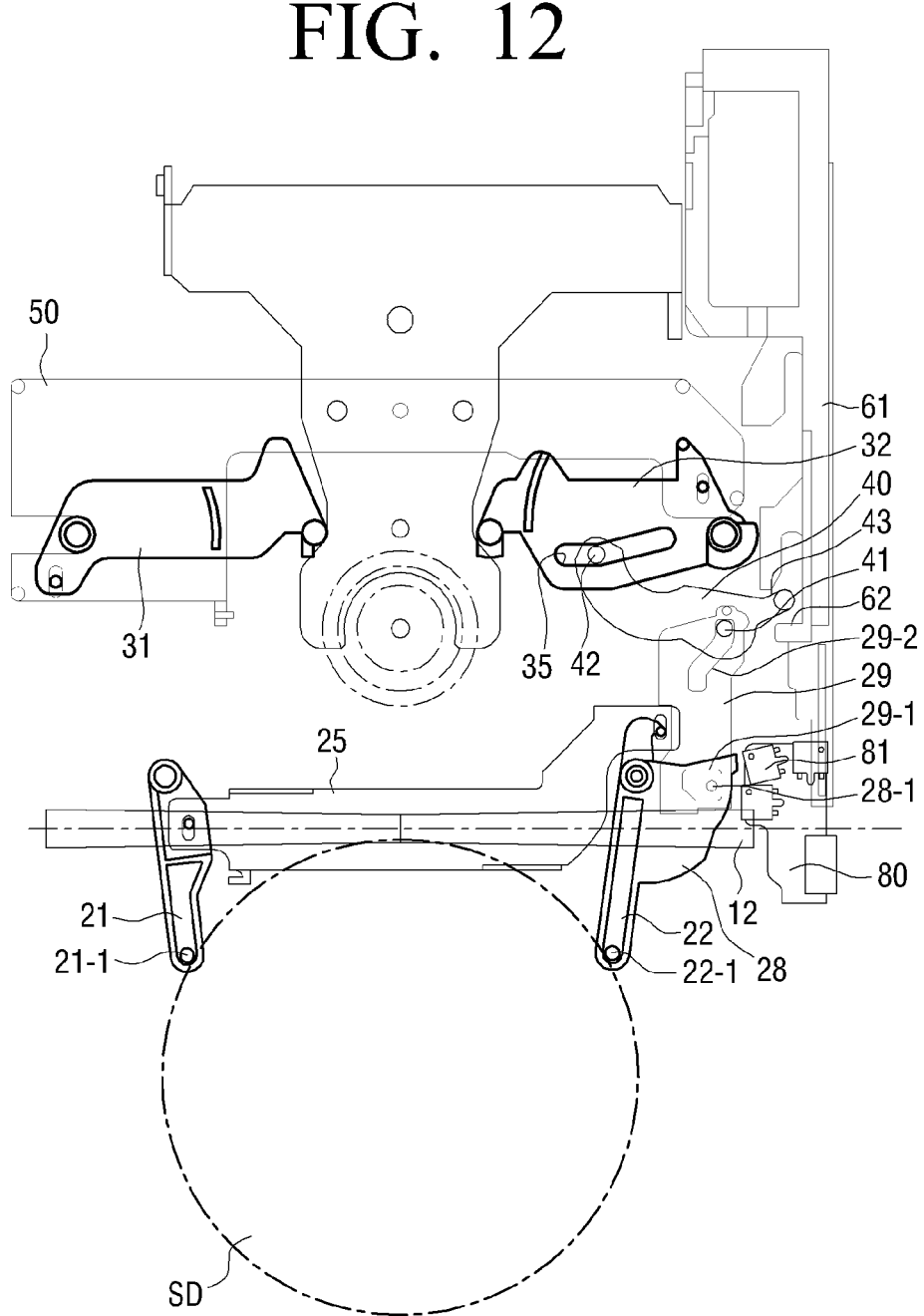
FIG. 12 is a plane view illustrating a state before a small diameter disk is inserted into the disk loading apparatus of FIG. 4.

FIG. 12 illustrates the disk loading apparatus 5 before the small diameter disk SD is inserted therein. At this time, the small diameter loading lever 40 is located in the first position in which the small diameter loading lever 40 interferes with the slide cam 61 and the large diameter loading lever 50 is located in a position in which it is not interfering with the slide cam 61. The dog 28 of the right selecting lever 22 of the disk selecting unit 20 contacts the driving switch 81 and the carrying roller 12 of the carrying unit 10 is stopped.

When the disk SD is inserted in this state, the left and right selecting levers 21 and 22 are rotated. When the right selecting lever 22 rotates, the dog 28 is rotated to separate from the driving switch 81. Then the driving switch 81 turns on to operate the driving motor M. As the driving motor M operates, the carrying roller 12 of the carrying unit 10 is rotated via the gear train 90 (FIG. 5). When the carrying roller 12 rotates, the inserted disk SD is automatically moved toward the chuck unit 70 by the carrying roller 12. Although the disk SD moves and a middle portion of the disk SD having a maximum width thereof contacts the projections 21-1 and 22-1 of the pair of selecting levers 21 and 22, the pair of selecting levers 21 and 22 is rotated by only a small angle. For example, even when the middle portion of the small diameter disk SD contacts the projections 21-1 and 22-1 of the pair of selecting levers 21 and 22, the pair of selecting levers 21 and 22 is rotated into positions approximately parallel to the center line CL of the chuck unit 70. When the right selecting lever 22 is rotated into a state in which it is approximately parallel to the center line CL of the chuck unit 70, the connecting projection 28-1 formed on the dog 28 moves inside the through hole 29-1 of the connecting link 29 and does not apply a force to the connecting link 29. Therefore, although the right selecting lever 22 is rotated by the small diameter disk SD, the connecting link 29 is not moved in the disk-inserting direction (arrow B, FIG. 7). Since the connecting link 29 does not move, the small diameter loading lever 40 is maintained in the first position in which it interferes with the slide cam 61.

Figure 13:
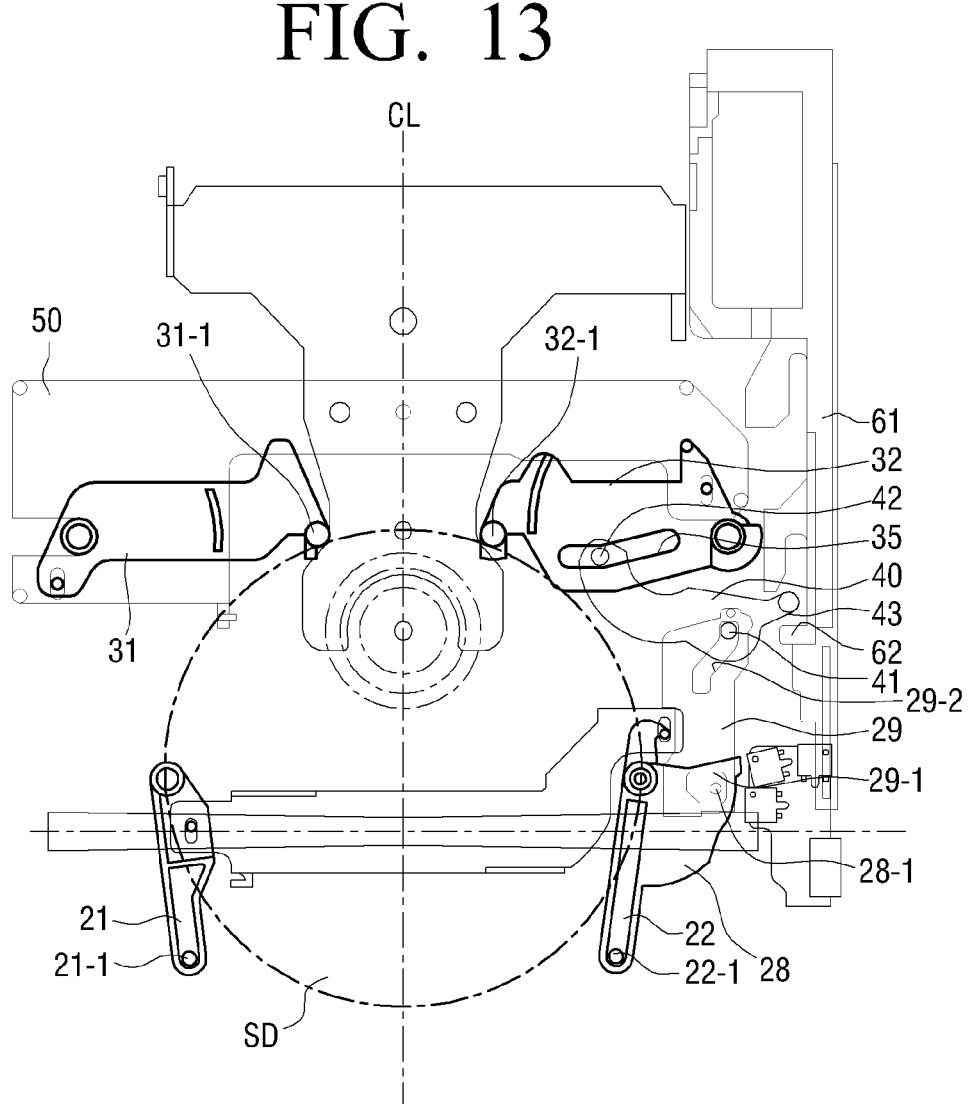
FIG. 13 is a plane view illustrating a state in that the small diameter disk begins to contact a pair of guide arms in the disk loading apparatus of FIG. 12.
Figure 14:
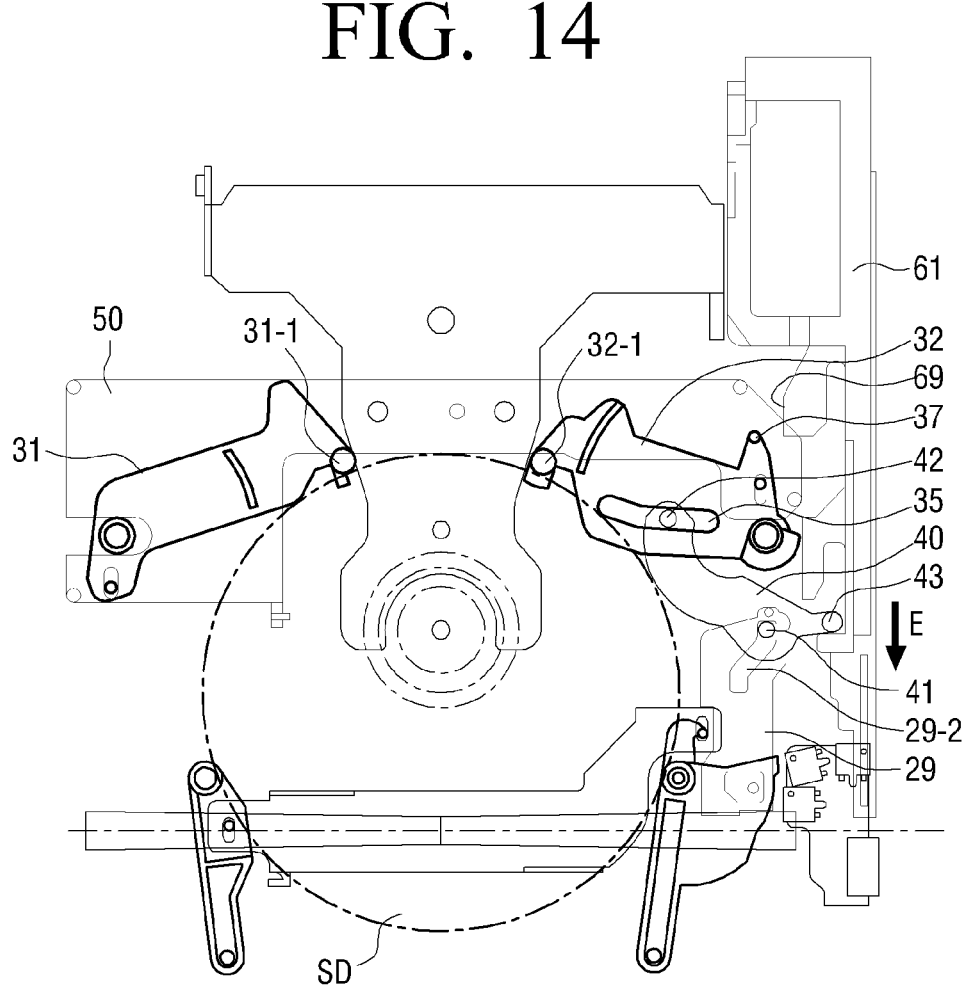
FIG. 14 is a plane view illustrating a state in that the pair of guide arms are rotated by the small diameter disk and a small diameter loading lever moves a sliding cam unit in the disk loading apparatus of FIG. 13.
Figure 15:
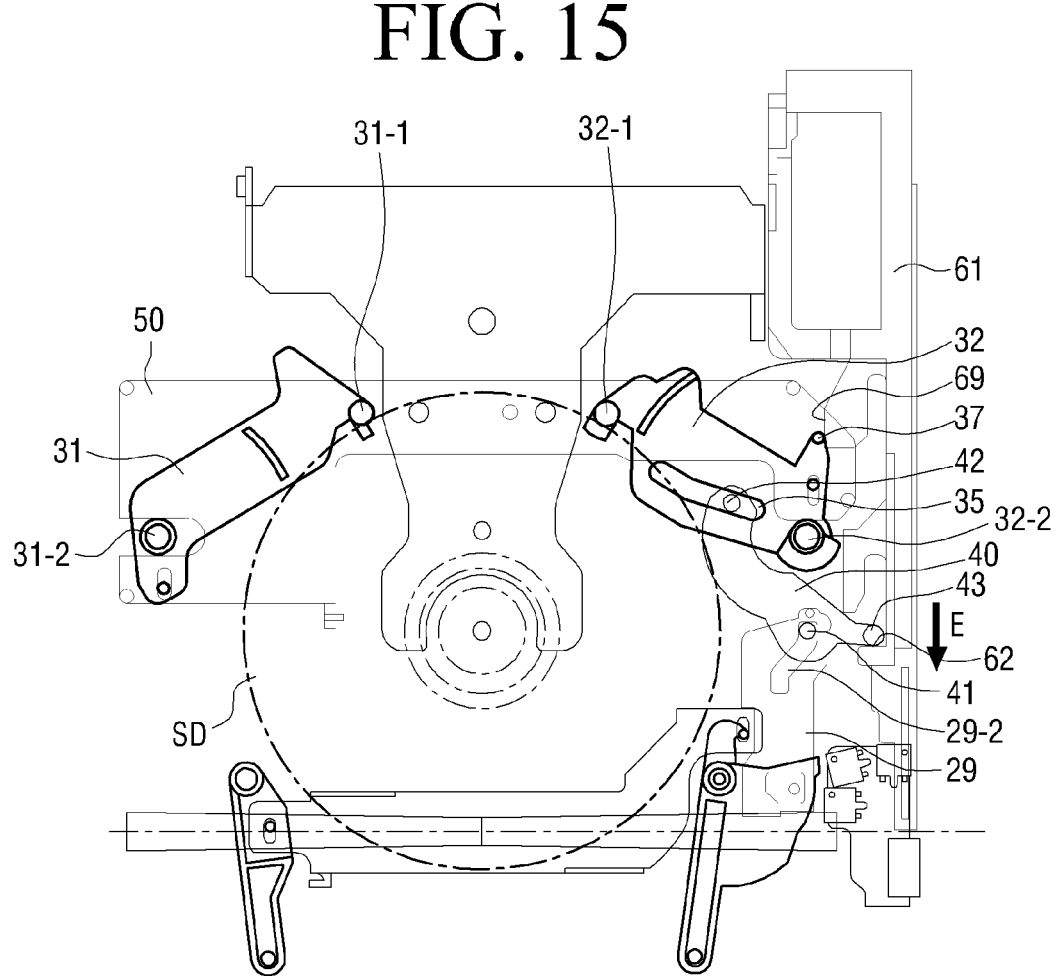
FIG. 15 is a plane view illustrating a state in that rotation of a right guide arm is blocked by the slide cam unit in the disk loading apparatus of FIG. 14.
Figure 16:
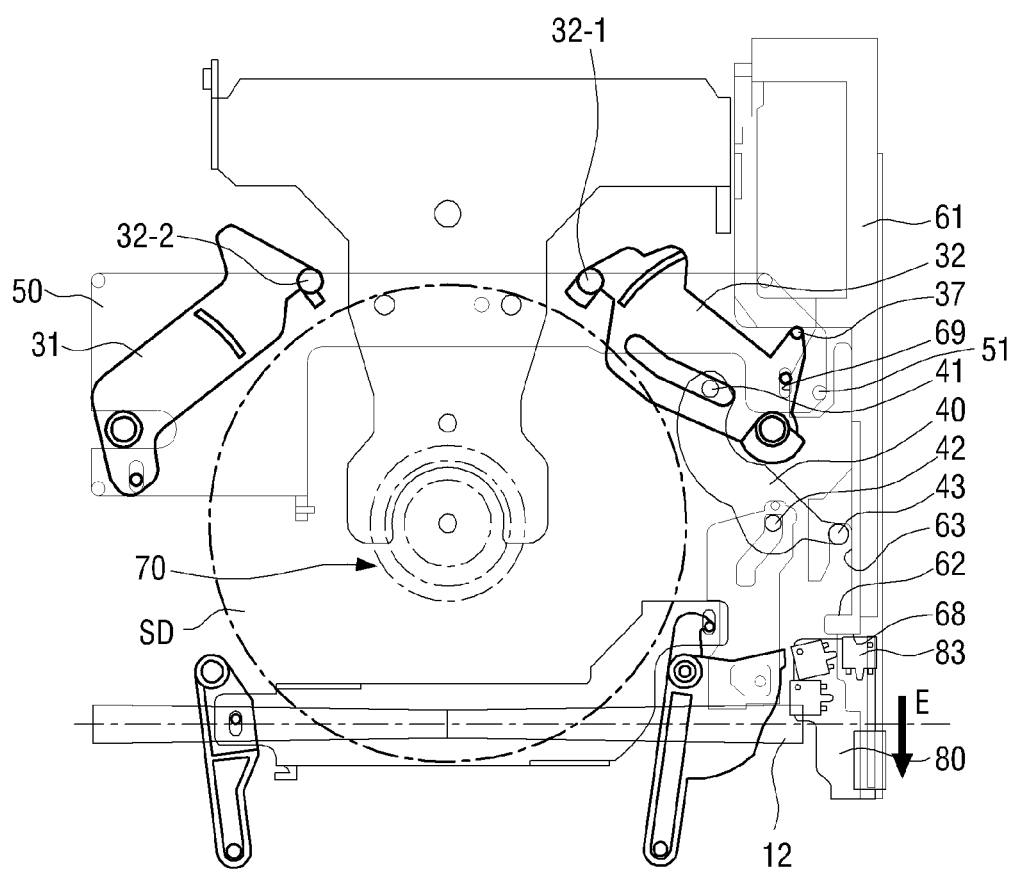
FIG. 16 is a plane view illustrating a state in that arm projections of the pair of guide arms are spaced apart from the small diameter disk by the slide cam unit in the disk loading apparatus of FIG. 15.

When the disk SD moves in this state, as illustrated in FIG. 13, the outer circumferential surface of the disk SD contacts the arm protrusions 31-1 and 32-1 of the pair of guide arms 30. While the disk SD continuously moves, the pair of guide arms 30 is rotated on the first and second arm rotation shafts 31-2 and 32-2 by the movement of the disk SD. When the pair of guide arms 30 rotates, as illustrated in FIG. 14, the small diameter loading lever 40 starts to be rotated on the second guide pin 41 by the movement of the first guide pin 42 of the small diameter loading lever 40 inserted in the first guiding groove 35 of the right guide arm 32. Then the first pressing projection 43 of the small diameter loading lever 40 contacts the small diameter contacting portion 62 of the slide cam 61 so that the slide cam 61 starts to move in the direction (arrow E) opposite to the disk-inserting direction, as shown in FIG. 15. Also, the large diameter loading lever 50 is moved in the right direction (arrow D) by the pair of guide arms 30.

When the pair of guide arms 30 is further rotated by inserting of the disk SD, the stop protrusion 37 formed on the right guide arm 32 contacts the stop wall 69 of the slide cam 61 to prevent the pair of guide arms 30 from rotating, as shown in FIG. 15. At this time, the center of the small diameter disk SD is aligned with the center of the chuck unit 70.

The moving distance of the slide cam 61 is determined by a rotating angle of the small diameter loading lever 40. In this embodiment, the slide cam 61 moves approximately 2 mm by rotation of the small diameter loading lever 40.

When the slide cam 61 moves approximately 2 mm, the rack gear 66 of the slide cam 61 is meshed with the cam gear 96 of the gear train 90 (FIG. 5). Then, the slide cam 61 is continuously moved in the direction of arrow E in FIGS. 15 and 16 by the power of the driving motor M to allow the chuck switch 83 to operate. After the chuck switch 83 operates, operation of the disk loading apparatus 5 is the same as that of the large diameter disk LD. Therefore, detailed explanations thereof are omitted.

As described above, with the disk loading apparatus 5 according to an exemplary embodiment, since the large diameter loading lever 50 and the small diameter loading lever 40 are disposed at the same plane above the pair of guide arms 30, a structure for loading the disk is formed as a two-level structure having one level in which the large diameter loading lever 50 and the small diameter loading lever 40 are located and another level in which the pair of guide arms 30 is located. Therefore, the disk loading apparatus 5 according to an exemplary embodiment may have a height lower than that of a related art disk loading apparatus 100 having the three-level structure.

Further, since a disk loading apparatus 5 according to an exemplary embodiment has no element in an area in which it would interfere with the pickup unit 7, reliability of the product is enhanced.

While exemplary embodiments have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concept.

What is claimed is:

1. A disk loading apparatus comprising:
    a disk selecting unit which is rotatable through a rotating angle which corresponds to a size of an inserted disk;
    a first guide arm and a second guide arm which are spaced apart from the disk selecting unit and rotate when contacted by the inserted disk;
    a small diameter loading lever which rotates due to a rotation of the second guide arm;
    a large diameter loading lever which moves due to movement of the first guide arm and the second guide arm;
    a slide cam unit which moves due to movement of one of the small diameter loading lever and the large diameter loading lever; and
    a chuck unit which is disposed between the first guide arm and the second guide arm and the disk selecting unit and chucks the inserted disk due to movement of the slide cam unit, wherein the small diameter loading lever and the large diameter loading lever are disposed at a same height above the first guide arm and the second guide arm.

2. The disk loading apparatus of claim 1, further comprising:
a carrying unit which is disposed below the disk selecting unit and carries the inserted disk toward the first guide arm and the second guide arm.

3. The disk loading apparatus of claim 2, wherein the carrying unit comprises:
a supporting member disposed below the disk selecting unit; and
a first carrying roller and a second carrying roller which are disposed below the supporting member and carry the inserted disk.

4. The disk loading apparatus of claim 3, wherein the first carrying roller comprises a first tapered roller, the second carrying roller comprises a second tapered roller, and an end of the first taper roller faces an end of the second taper roller.

5. The disk loading apparatus of claim 1, wherein the disk selecting unit comprises:
a first selecting lever and a second selecting lever, each comprising a first end which contacts an outer circumferential surface of the inserted disk, and a second end;
an intermediate link which is connected to the second end of each of the first selecting lever and the second selecting lever and moves laterally due to a rotation of the first selecting lever and the second selecting lever; and
a connecting link which is parallel to the slide cam unit and is disposed between the small diameter loading lever and the second selecting lever and transmits a motion of the second selecting lever to the small diameter loading lever.

6. The disk loading apparatus of claim 5, wherein when the inserted disk is a small diameter disk, the small diameter loading lever is positioned in a first position due to a movement of the selecting lever and the connecting link, and in the first position, the small diameter loading lever interferes with the slide cam unit, and
wherein when the inserted disk is a large diameter disk, the small diameter loading lever is positioned in a second position in which the small diameter loading lever does not interfere with the slide cam unit.

7. The disk loading apparatus of claim 1, wherein a first end of the first guide arm and a first end of the second guide arm each contact the outer circumferential surface of the inserted disk and a second end of the first guide arm and a second end of the second guide arm are each rotatably connected with the large diameter loading lever, and
wherein when the inserted disk presses the first end of the first guide arm and the first end of the second guide arm, the first guide arm and the second guide arm cause the large diameter loading lever to move toward the slide cam unit.

8. The disk loading apparatus of claim 7, wherein the first guide arm is connected with the large diameter loading lever at a first arm connecting portion, the second guide arm is connected with the large diameter loading lever at a second arm connecting portion, and the first arm connecting portion and the second arm connecting portion are disposed at opposite sides of a straight line joining a rotation center of the first guide arm and a rotation center of the second guide arm.

9. The disk loading apparatus of claim 1, wherein the slide cam unit comprises:
a small diameter contacting portion configured to contact the small diameter loading lever; and
a large diameter contacting portion configured to contact the large diameter loading lever.

10. The disk loading apparatus of claim 9, wherein the large diameter contacting portion comprises a sloping surface, and the large diameter loading lever comprises a roller configured to contact the sloping surface.

11. The disk loading apparatus of claim 1, wherein when the inserted disk is a large diameter disk, the large diameter loading lever causes the slide cam unit to move in a straight line, and
wherein when the inserted disk is a small diameter disk, the small diameter loading lever causes the slide cam unit to move in a straight line.

12. The disk loading apparatus of claim 1, wherein the second guide arm comprises a stop protrusion, and when the stop protrusion contacts the slide cam, the stop protrusion restricts rotation of the second guide arm.

13. The disk loading apparatus of claim 12, wherein when the inserted disk is a small diameter disk, the stop protrusion contacts the slide cam unit, thereby restricting a rotating angle of the second guide arm, and
wherein when the inserted disk is a large diameter disk, the stop protrusion does not contact the slide cam unit and does not restrict rotation of the second guide arm.

14. The disk loading apparatus of claim 1, wherein at least one of the large diameter loading lever, the second guide arm comprises a line-shape protrusion which prevents a surface of the large diameter loading lever from contacting a surface of the second guide arm.

15. The disk loading apparatus of claim 1, wherein when no disk is inserted into the disk loading apparatus, the small diameter loading lever is disposed in a position in which the small diameter loading lever interferes with the slide cam unit, and the large diameter loading lever is disposed in a position in which it does not interfere with the slide cam unit.

16. A disk loading apparatus comprising:
a disk selecting unit comprising a first selecting lever and a second selecting lever each comprising a first end which contacts an outer circumferential surface of an inserted disk;
a first guide arm and a second guide arm which rotate when contacted by the inserted disk;
a small diameter loading lever which rotates due to a rotation of the second guide arm;
a large diameter loading lever which moves due to a movement of the first guide arm and the second guide arm;
a connecting link connected between the second selecting lever and the small diameter loading lever;
wherein the first guide arm, the second guide arm and the connecting link are coplanar and the small diameter loading lever and the large diameter loading lever are coplanar.

* * * * *